United States Patent [19]
Blair et al.

[11] Patent Number: 5,370,831
[45] Date of Patent: Dec. 6, 1994

[54] METHOD OF MOLDING POLYMERIC SKINS FOR TRIM PRODUCTS

[75] Inventors: Michael F. Blair, Vernon; Foster P. Lamm, Windsor; Raymond A. Zatorski, East Hampton, all of Conn.

[73] Assignee: United Technologies Corporation, Hartford, Conn.

[21] Appl. No.: 993,340

[22] Filed: Dec. 18, 1992

[51] Int. Cl.⁵ .................. B05D 1/02; B05D 5/06; B29C 41/08
[52] U.S. Cl. .................. 264/24; 264/245; 264/255; 264/309; 427/195; 427/201; 427/421; 427/470
[58] Field of Search .......... 264/24, 309, 126, 255, 264/303, 245; 427/470, 421, 195, 201

[56] References Cited

U.S. PATENT DOCUMENTS

| | | | |
|---|---|---|---|
| Re. 28,068 | 7/1974 | Lemelson | 264/255 X |
| 3,091,548 | 5/1963 | Dillon, II | 427/201 X |
| 3,278,656 | 10/1966 | Dicks et al. | 264/24 |
| 3,660,547 | 5/1972 | Ruekberg | 264/245 X |
| 3,930,061 | 12/1975 | Scharfenberger | 264/24 |
| 3,932,107 | 1/1976 | Proudfit | 425/509 |
| 3,943,212 | 3/1976 | Szatkowski | 264/24 |
| 3,950,483 | 4/1976 | Spier | 264/245 X |
| 4,061,702 | 12/1977 | Kessler | 264/24 |
| 4,104,416 | 8/1978 | Parthasarathy et al. | 427/195 X |
| 4,122,146 | 10/1978 | Bertrandi | 264/245 |
| 4,207,359 | 6/1980 | Hannon et al. | 427/195 |
| 4,224,779 | 9/1980 | Guedet | 53/426 |
| 4,391,860 | 7/1983 | Rotolico et al. | 427/201 X |
| 4,433,959 | 2/1984 | Faunce | 433/201 |
| 4,668,451 | 5/1987 | Langson | 264/245 X |
| 4,681,712 | 7/1987 | Sakakibara | 264/24 |
| 4,685,985 | 8/1987 | Stueke | 427/195 X |
| 4,704,953 | 11/1987 | Wilson | 98/115.2 |
| 4,769,191 | 9/1988 | Diana | 264/245 X |
| 4,783,302 | 11/1988 | Kurimoto | 264/245 X |
| 4,882,173 | 11/1989 | LaRoche et al. | 264/255 X |
| 4,894,004 | 1/1990 | Brault | 264/245 X |
| 4,940,012 | 7/1990 | Zimmerman et al. | 264/309 |
| 4,985,490 | 1/1991 | Rosthauser et al. | 524/871 |
| 5,093,066 | 3/1992 | Butchelder et al. | 264/301 X |
| 5,178,902 | 1/1993 | Wong et al. | 427/195 X |
| 5,266,253 | 11/1993 | Dijkhuizen et al. | 264/245 X |
| 5,304,273 | 4/1994 | Kenrick et al. | 264/245 X |

*Primary Examiner*—Karen Aftergut
*Attorney, Agent, or Firm*—George J. Romanik

[57] ABSTRACT

A polymeric skin can be molded by heating a mold surface to a temperature sufficient to melt a casting material and controllably projecting particles of the casting material toward the heated mold surface. Particles of the casting material that impinge on the mold surface melt and adhere to the mold surface. The mold surface is cooled to a temperature at which the casting material solidifies to form a skin. By varying the amount or type of material projected toward the heated mold surface, the method can make multilayer skins, skins from more than one material with a graded transition between materials, multicolor skins, and skin having a controlled, nonuniform thickness.

4 Claims, 1 Drawing Sheet

METHOD OF MOLDING POLYMERIC SKINS FOR TRIM PRODUCTS

TECHNICAL FIELD

The present invention is directed to a method of molding polymeric skins for use in motor vehicle trim products and similar products.

BACKGROUND ART

Polymeric skins for trim products, especially motor vehicle trim products, are currently made with rotocasting or slush molding techniques. Common motor vehicle trim products include instrument panels, door trim panels, armrests, headrests, seat covers, and similar products. Other industries in which polymeric skins may be used include the aviation and marine industries.

Rotocasting and slush molding both use heated molds to melt a powdered casting material such as polyvinyl chloride (PVC). In the rotocast process, molds are inserted into large ovens in which the air temperature is far above the melting point of the casting material, for example about 100° C. (180° F.) to about 400° C. (720° F.) above the melting point of the casting material. When the mold interior surface reaches a temperature slightly higher than the melting point of the casting material, the casting material is dumped into the mold. The mold is then rotated to distribute the casting material over the surface of the mold with a combination of gravity and mold movement. Slush molding is a variation on rotocasting in which the mold cavity is filled with casting material. Only the casting material near the hot mold wall melts. Excess casting material is dumped out of the mold. In both rotocasting and slush molding, the casting material often is distributed uniformly (or uniformly enough) over the mold surface. Neither method, however, allows precise control over the distribution of the casting material. As a result, skins made by rotocasting and slush molding can have undesired nonuniformities that lead to defective products. Because these methods lack a means for precisely controlling the distribution of the casting material within the mold, they are unsuitable for making multicolor skins or practicing other molding techniques that require precise control over casting material distribution.

Rotocasting and slush molding methods also suffer from other drawbacks. For example, the casting equipment, especially the oven, is very large. As a result, the equipment requires large amounts of factory floor space. Second, both methods consume large amounts of energy because of the high heat losses associated with moving molds into and out of the oven. In addition, heating the molds to high temperatures can char or burn the skins, resulting in unsatisfactory products that must be reworked or scrapped.

Therefore, what is needed in the industry is a method of molding polymeric skins that can make multicolor skins and permits precise control over casting material distribution.

DISCLOSURE OF THE INVENTION

The present invention is directed to a method of molding polymeric skins that can make multicolor skins and permits precise control over casting material distribution.

One aspect of the invention includes a method of molding a polymeric skin having a controlled, nonuniform thickness. A mold surface of a mold is heated to a temperature sufficient to melt a casting material. Particles of the casting material are controllably projected toward the heated mold surface. Particles impinging on the mold surface melt and adhere to the mold surface. The amount of casting material projected toward selected portions of the heated mold surface is controllably varied to produce a skin with a desired, controlled, nonuniform thickness. Portions of the skin located at high wear areas in a finished product are thicker than an average skin thickness in the finished product. Portions of the skin to be removed from the finished product are thinner than the average skin thickness in the finished product. The mold surface is cooled to a temperature at which the casting material solidifies to form a skin having a controlled, nonuniform thickness.

Another aspect of the invention includes a method of molding a multilayer polymeric skin. A mold surface of a mold is heated to a temperature sufficient to melt a first casting material. A stream of particles of the first casting material is controllably projected toward the heated mold surface. Particles impinging against the heated mold surface melt and adhere to the heated mold surface, covering a desired portion of the heated mold surface with the first casting material. A stream of particles of a second casting material is controllably projected toward the heated mold surface. Particles impinging on the first casting material covering the heated molding surface melt and adhere to the first casting material to cover a desired portion of the first casting material with the second casting material. The mold surface is cooled to a temperature at which the first and second casting materials solidify to form a skin having a first layer made from the first casting material and a second layer made from the second casting material.

Another aspect of the invention includes a method of molding a polymeric skin from more than one material. Portions of a mold surface of a mold are covered with a mask to prevent a first casting material from contacting the mold surface. This divides the mold surface into an uncovered portion and a covered portion. The mold surface is heated to a temperature sufficient to melt the first casting material. A stream of particles of the first casting material is controllably projected toward the heated mold surface. Particles impinging against the uncovered portion of the mold surface melt and adhere to the uncovered portion of the mold surface. Particles impinging against the covered portion of the mold surface do not adhere to the mold surface. The mask is removed to expose uncoated portions of the mold surface. The mold surface is heated to a temperature sufficient to melt a second casting material. A stream of particles of the second casting material is controllably projected toward the uncoated portions of the mold surface. Particles impinging against the uncoated portions melt and adhere to the mold surface. The mold surface is cooled to a temperature at which the first and second casting materials solidify to form a skin made from more than one material.

Another aspect of the invention includes a second method of molding a polymeric skin from more than one material. A mold surface of a mold is heated to a temperature sufficient to melt first and second casting materials. A stream of particles of the first casting material is controllably projected toward the heated mold surface. Particles impinging against the mold surface melt and adhere to the mold surface to form a portion of skin that consists essentially of the first casting material.

A stream of particles of the second casting material is controllably projected toward the heated mold surface while the projection of first casting material particles is decreased. The second casting material particles mix with the first casting material particles, impinge against the mold surface, and melt together with the first casting material particles to form a portion of skin that comprises the first casting material and the second casting material. The projection of first casting material particles is stopped while the projection of second casting material particles is continued to form a portion of skin that consists essentially of the second casting material. The mold surface is cooled to a temperature at which the first and second casting materials solidify to form a skin that has a graded transition between the portion consisting essentially of the first casting material and the portion consisting essentially of the second casting material.

These and other features and advantages of the present invention will become more apparent from the following description and accompanying drawing.

BEST MODE FOR CARRYING OUT THE INVENTION

The method of the present invention allows precise control over the distribution of casting material when molding polymeric skins. The method of the present invention can be particularly useful for making multilayer skins, multicolor skins, and skins having a controlled, nonuniform thickness.

A key aspect of the present invention includes the step of controllably projecting casting material particles against a surface of a mold heated to a temperature above the melting point of the casting material. The casting material may be any powdered thermoplastic or thermosetting polymeric material. For example, the casting material may be a vinyl material, such as polyvinyl chloride (PVC), a rubber material, such as Kraton ® rubber (Shell Oil Company, Houston, Tex.), or an adhesive material. Preferably, the casting material will be an electrical insulator compatible with an electrostatic spray means. The size of the casting material particles depends on the means by which they are projected against the mold surface. For example, if the particles are projected with an electrostatic spray means they may be range from about 1 $\mu$m to about 250 $\mu$m. The amount of casting material projected onto the mold surface can be controlled by any conventional control means to obtain a desired skin thickness. Skins up to at least about 0.2 cm (0.080 inch) thick can be made. Proper selection of casting material and molding conditions may allow thicker skins to be made as well. Typically, skins will be about 0.11 cm (0.045 inch) to about 0.15 cm (0.060 inch) thick. The skins can be of uniform thickness or of controlled, nonuniform thickness.

Figure 1:
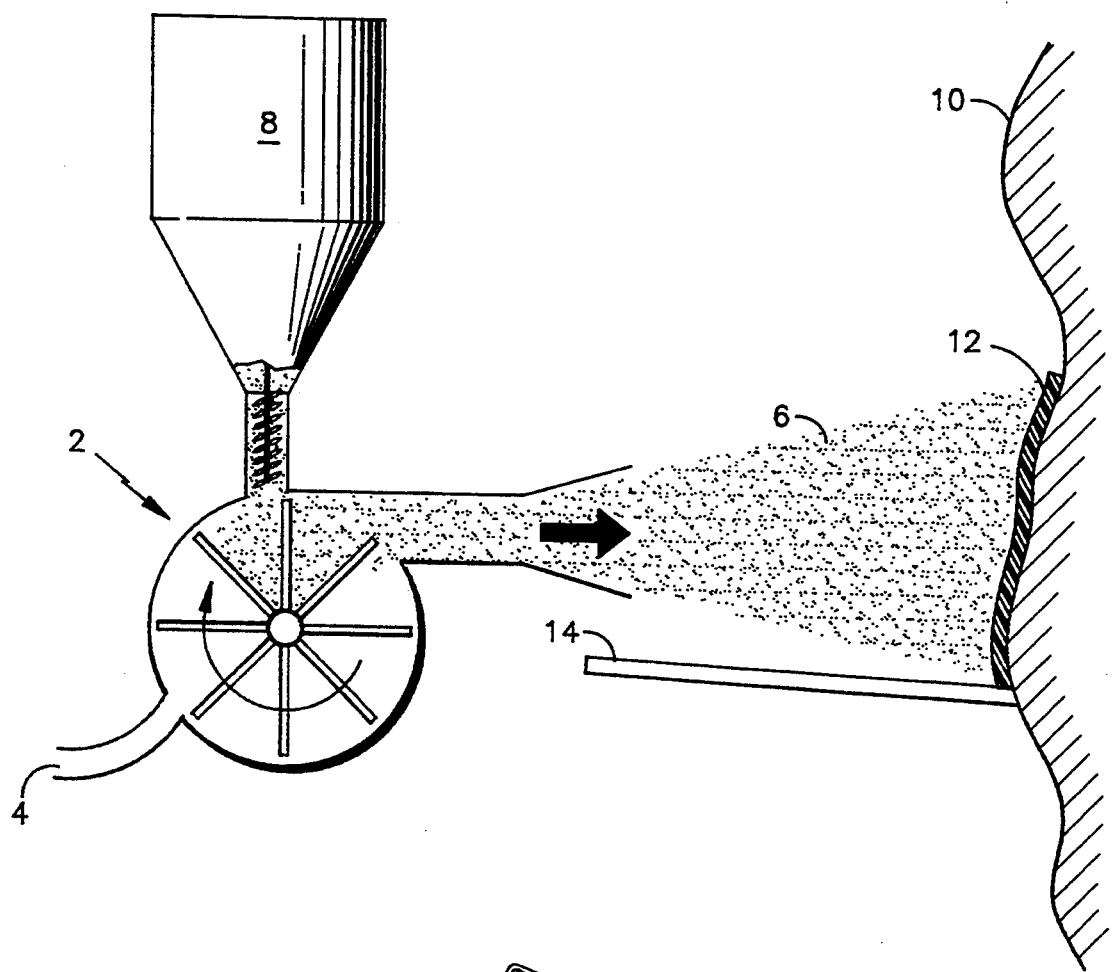
FIG. 1 is a schematic of one embodiment of the present invention.

Any means capable of controllably projecting casting material particles against the mold surface may be used with the present invention. For example, a blower 2 shown in FIG. 1 can use a preheated air stream 4 to project casting material particles 6 from a feed hopper 8 against a stationary, hot mold surface 10. As the casting material particles 6 impinge on the mold surface 10, they melt to form a skin 12. If desired, a separator plate 14 may be used to shield portions of the mold surface 10 from the casting material particles 6. This allows more than one casting material, such as casting materials of different colors, to be projected onto the same mold surface. Alternately, a portion of the mold surface 10 may be covered with a mask to prevent casting material particles 6 from impinging on the mold surface. The mask may be made from any material that will not degrade when the mold surface is heated. Another possible means for projecting the casting material particles 6 against the mold surface 10 is a jet of compressed, preheated air.

Figure 2:
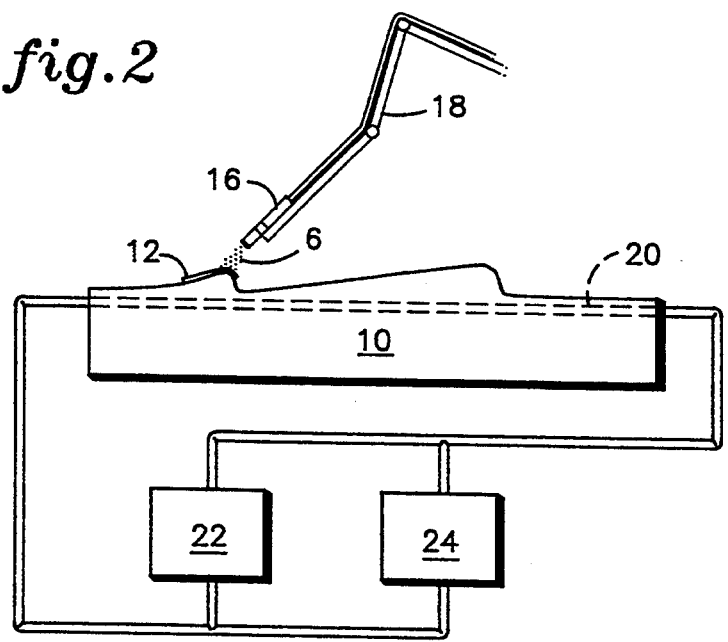
FIG. 2 is a schematic of a second embodiment of the present invention.

Preferably, the casting material particles 6 will be projected against a grounded, electrically conductive, heated mold surface 10 with an electrostatic spray means 16 as shown in FIG. 2. The electrostatic spray means 16 may be any conventional electrostatic spray gun or comparable spray means. Suitable electrostatic spray means are manufactured by Gema Volstatic (Indianapolis, Ind.), Graco, Inc. (Minneapolis, Minn.), and Binks & Sames (Franklin Park, Ill.) and are commercially available from numerous industrial supply houses. In particular, a model 750 electrostatic spray gun made by Gema Volstatic and leased from PCF Group, Inc. (Stamford, Conn.) provided good results. An electrostatic spray gun entrains nonconductive particles in a gas stream, such as an air stream, and passes them through a charged field that imparts an electrostatic charge to the particles. The electrostatic charge on the particles helps direct them to a grounded target surface, in this case, the mold surface 10. The electrostatic charge also holds the particles against the mold surface 10 until they melt to form a skin 12. This can be especially useful if the mold surface is oriented vertically rather than horizontally as in FIG. 2. This feature also helps apply an even coat of particles to crevices and portions of the mold surface that are at an awkward angle to the electrostatic spray means 16.

The electrostatic spray means 16 may be hand held or, as shown in FIG. 2, mounted on an articulated arm 18, such as the arm of an industrial robot. The articulated arm 18 allows the motion of the electrostatic spray means 16 to be controlled precisely by a robot or other automatic control device. The articulated arm 18 also allows the mold surface 10 to be stationary. The electrostatic spray means 16 should be operated according to the manufacturer's instructions. The size of the casting material particles 6, air flow rate, and air pressure should be selected with the manufacturer's aid to produce a suitable skin 12 on the mold surface 10. These parameters plus the distance between the electrostatic spray means 16 and mold surface 10 determine the velocity with which the casting material particles 6 impinge on the mold surface 10. The particle velocity should be high enough to permit the casting material particles 6 to be applied quickly, but slow enough to allow the particles to adhere to the mold surface 10. As is usual when using electrostatic spray means, some degree of routine experimentation will be needed to establish the specific spray parameters that should be used for each product.

Good control over the temperature of the mold surface 10 can contribute to successful use of the method of the present invention. The mold surface 10 should be made from a highly heat conductive material to permit rapid and even heating and cooling. For example, the mold surface 10 may be made from electroplated nickel.

The temperature of the mold surface 10 during molding operations depends on the melting point of the casting material. During molding operations, the mold surface 10 should be at a uniform temperature slightly above the melting point of the casting material. For example, the mold surface temperature may be no more than about 10° C. (18° F.) to about 20° C. (36° F.) above the melting point of the casting material. Preferably, the mold surface temperature will be selected to provide particularly desirable casting material flow characteristics. For example, the temperature should be adequate to melt the casting material while providing a viscosity that allows the casting material to adhere to the mold surface 10. If the mold surface temperature is too high, the casting material viscosity will be low enough to allow the casting material to run off the mold surface 10. Preferably, the casting material will melt and flow together to form a continuous skin, but will not sag or droop at the desired skin thickness. The preferred temperature above the melting point will vary based on the casting material type and additives used to impart the desired physical properties to the finished article. The mold surface temperature suitable for a particular casting material may be determined by routine experimentation.

The mold surface 10 may be heated and cooled by any means. For example, the mold surface may be heated by hot liquid or hot air impinging on the back of the mold or by hot liquid bathing the back of the mold. Preferably, as shown in FIG. 2, the mold surface 10 will be heated and cooled with a heat transfer fluid circulated though heat transfer tubes 20 in the mold located immediately behind the mold surface 10. The heat transfer fluid may be any conventional heat transfer fluid such as an oil. In the embodiment shown in FIG. 2, hot oil from a hot oil reservoir 22 is circulated through the heat transfer tube 20 to heat the mold surface 10. Cool oil from a cool oil reservoir 24 is circulated though the heat transfer tube 20 to cool the mold surface 10 at the end of molding operations. The temperature of the mold surface 10 may be controlled with any conventional temperature controller.

The method of the present invention may be used to make polymeric skins with a variety of new and useful configurations. For example, it can make skins with a controlled, nonuniform thickness. Portions of such skins subject to high wear, such as folds and seams, can be made thicker than the average skin thickness of the finished product. Similarly, portions of such skins that will be cut out or otherwise removed from the finished product, such as radio and glove box holes in an automobile instrument panel skin, can be made thinner than the average skin thickness. If desired, those areas of the mold surface can be left uncoated. Skins made with a controlled, nonuniform thickness can have improved wear characteristics and can be easier to make into a finished product than prior art skins.

The method of the present invention also may be used to make multilayer polymeric skins. For example, a thin layer of a first casting material can be applied to desired portions of the mold surface. While the first casting material is still molten, a thicker layer of a second casting material can be applied over the layer of the first casting material. After cooling, the skin will have a first layer made from the first casting material and a second layer made from the second casting material. This method can be useful when the first casting material is much more expensive than the second casting material, but only needs to make up the outer surface of the skin. For example, the first casting material may comprise an expensive color stabilizer that only needs to be included in the exterior portions of the skin. The second casting material may then be a less expensive material, without a color stabilizer, that gives the skin structural integrity. The thickness of each layer can be controlled to provide an optimum tradeoff between utility and material cost. Of course, skins with more than two layers also can be made.

In addition, the method of the present invention may be used to make multicolor polymeric skins from two or more casting materials that have different colors. For example, a portion of the mold surface may be covered with a mask to prevent a first casting material from contacting the mold surface. The mask may be made from any material that will not degrade when the mold is heated. For example, the mask may be made from a metal or an elastomeric solid, such as silicone rubber. The mask may either cover portions of the mold surface completely or be oriented to provide a shadowing effect along the sides of the mask. After heating the mold surface to a temperature sufficient to melt the first casting material, particles of the first casting material are projected toward the heated mold surface. Particles that impinge against uncovered portions of the mold surface melt and adhere to the mold surface. Particles that impinge against the portion of the mold surface covered by the mask do not adhere to the mold surface. The mold surface may be left at temperature or cooled to a temperature at which the first casting material at least partially solidifies. The mask is removed to expose uncoated portions of the mold surface. After adjusting the mold surface to a temperature sufficient to melt a second casting material, particles of the second casting material are projected toward uncoated portions of the mold surface. Particles that impinge against the uncoated portions melt and adhere to the mold surface. The mold surface is then cooled to a temperature at which the first and second casting materials solidify. Of course, more than two different casting materials can be used to make the skin. Experience has shown that this method produces a sharp line between the colors. There is substantially no running or bleeding between adjacent colors. This result was surprising because until this method was tried, it was not clear that the colors of the adjoining first and second casting materials would not run together. This same method can be used to make skins with multiple materials of the same color but different compositions.

The method of the present invention also may be used to produce a graded zone, rather than a sharp line, between adjoining colors or materials. For example, such a skin could be color graded from a dark, nonreflective color to a more decorative color. The skin can be made by projecting particles of a first casting material against a heated mold surface to form a portion of skin that consists essentially of the first casting material. Particles of a second casting material can then be projected against the heated mold surface while decreasing the flow of first casting material particles. The first and second casting material particles mix and melt together to form a portion of skin that comprises the first and second casting materials. The flow of the first casting material may then be stopped while continuing the flow of the second casting material to form a portion of skin that consists essentially of the second casting material. The flow of first and second casting materials can be controlled by sequentially projecting casting materials of different colors from the same spray gun onto the mold surface. The same effect can be achieved by projecting the different casting materials from two or more electrostatic spray means.

The following example demonstrates the present invention without limiting the invention's broad scope.

EXAMPLE

Polyvinyl chloride (PVC) powder was used to cast demonstration samples of automotive instrument panel skins. A 1990 Lincoln ® Town Car (Ford Motor Company, Dearborn, Mich.) instrument panel mold was used for this exercise. Both monochrome and dual color skins were made by the methods described above. All skins had excellent color uniformity with no gloss variation. The dual color skins had a sharp color split line that followed the contour of the mask. The replication of the tool surface was exact for all colors and across the color line. Some skins were made with uniform thickness. Other skins were made with nonuniform thickness (thicker along the stitch line and thinner in regions to be trimmed) to demonstrate the ability to control local skin thickness.

The present invention provides several benefits over prior art methods of making polymeric skins. For example, it provides a method of making multilayer skins, multicolor skins, and skins having a controlled, nonuniform thickness. In addition, because the means of projecting casting material particles against the mold surface is controllable, the method of the present invention can produce higher quality skins than prior art methods.

The present invention also dispenses with several of the mechanical and operational drawbacks of the prior art rotocasting and slush molding methods. For example, the present invention eliminates much of the machinery needed to lift and rotate rolocasting and slush molding molds. The ability to heat a mold surface with a heat transfer fluid pumped from a hot reservoir eliminates the need for a large oven to heat molds. The more precise temperature control that results from heating and cooling the mold surface with a closed-cycle hot-/cold heat transfer fluid reservoir system decreases energy costs and drastically reduces problems with charting or burning of the skins.

The invention is not limited to the particular embodiments shown and described herein. Various changes and modifications may be made without departing from the spirit or scope of the claimed invention.

We claim:

1. A method of molding a polymeric skin for a trim product from more than one material and having a graded transition between materials, comprising the steps of:
    (a) heating a mold surface of a mold to a temperature sufficient to melt first and second powdered polymeric casting materials,
    (b) controllably projecting a stream of particles of the first casting material toward a first portion of the heated mold surface such that the particles impinging against the first portion of the mold surface melt and adhere to the first portion of the mold surface, thereby forming a first portion of polymeric skin that consists essentially of the first casting material,
    (c) controllably projecting a stream of particles of the second casting material toward a second portion of the heated mold surface while decreasing the projection of first casting material particles, whereby the second casting material particles mix with the first casing material particles, impinge against the second portion of the mold surface, melt together with the first casting material particles and adhere to the second portion of the heated mold surface to form a second portion of polymeric skin that comprises the first casting material and the second casting material,
    (d) stopping the projection of first casting material particles while continuing the projection of second casting material particles toward a third portion of the heated mold surface such that the second casting material particles impinging against the third portion of the heated mold surface melt and adhere to the third portion of the heated mold surface, thereby forming a third portion of polymeric skin that consists essentially of the second casting material, and
    (e) cooling the mold surface to a temperature at which the first and second casting materials solidify, thereby forming a polymeric skin that has a graded transition between the first portion consisting essentially of the first casting material and the third portion consisting essentially of the second casting material.

2. The method of claim 1, wherein the mold surface is grounded and the first and second casting materials are given an electrostatic charge before being projected toward the heated mold surface.

3. The method of claim 1, wherein the first casting material has a first color and the second casting material has a second color, whereby the skin is a multicolor skin.

4. The method of claim 1, wherein the mold surface is heated and cooled by circulating a heat transfer fluid through the mold.

* * * * *